United States Patent [19]

Katsuno et al.

[11] Patent Number: 5,139,715
[45] Date of Patent: Aug. 18, 1992

[54] METHOD OF FORMING A FOAMED GASKET

[75] Inventors: Nobuhiro Katsuno, Tokyo; Masatoshi Arai, Gunma, both of Japan

[73] Assignees: Three Bond Co., Ltd.; Shin-Etsu Chemical Co., Ltd., Tokyo, Japan

[21] Appl. No.: 577,659

[22] Filed: Sep. 5, 1990

[30] Foreign Application Priority Data

Sep. 6, 1989 [JP] Japan .................. 1-230980

[51] Int. Cl.$^5$ .......................... B29C 67/00
[52] U.S. Cl. ..................... 264/46.4; 521/122; 525/478
[58] Field of Search ........... 427/387, 373; 264/54, 264/46.4; 525/478; 428/450; 521/122

[56] References Cited

U.S. PATENT DOCUMENTS

| | | | |
|---|---|---|---|
| 3,524,825 | 8/1970 | Rill, Jr. .................. | 264/54 |
| 3,923,705 | 12/1975 | Smith ..................... | 528/15 |
| 4,801,622 | 1/1989 | Inoue et al. .............. | 525/478 |
| 4,892,691 | 1/1990 | Kolossow ................. | 264/54 |
| 4,960,847 | 11/1990 | Arai et al. ............... | 525/477 |
| 4,972,001 | 11/1990 | Kimura et al. ............ | 521/122 |

OTHER PUBLICATIONS

"Textbook of Polymer Science", F. Billmeyer, Interscience Pub., New York (1962) pp. 495–496.

*Primary Examiner*—Michael Lusignan
*Attorney, Agent, or Firm*—Wegner, Cantor, Mueller & Player

[57] ABSTRACT

A method of forming a foamed gasket comprising the steps of separately introducing a composition of expandable polysiloxanes consisting of two liquids of a main agent and a curing agent into a mixing chamber having a special rotor secured in the inside thereof, mixing the two liquids in the mixing chamber by rotating the rotor, discharging the obtained mixture on the sealing part of an article to be coated such as waterproof case of a car and foaming and curing the mixture to form a foamed gasket.

The present invention is excellent in workability and may be applied to the on-line system, and the obtained foamed gasket is excellent in sealability.

5 Claims, 3 Drawing Sheets

METHOD OF FORMING A FOAMED GASKET

BACKGROUND OF THE INVENTION

1. Field of the Invention

The present invention relates to a method of forming a foamed gasket applied on a sealing surface of various kinds of articles, such as waterproof cases for containing electronic parts etc. of cars, head lights of cars, lids of various containers and the like, and more particularly, a method of forming a foamed gasket in which expandable materials of two-liquid types are used as raw materials which are long in pot life, short in curing time and high in the rate of closed cells, and in which these two liquids may be homogeneously and rapidly mixed by a simple step, and thus becoming excellent in workability and capable of applying to on-line systems.

2. Description of the Prior Art

On the sealing surfaces of waterproof cases of cars, head-lights or lids of various containers, foamed gaskets are formed.

Exemplarily, on the contacting part between the body and the lid of the waterproof case, such as on the sealing groove as indicated in FIG. 1, moreover, on the contacting part between the body and the glass cap of the head light, such as on the sealing groove of the body as indicated in FIG. 3, and furthermore, on the contacting part between the lid and the body of the various containers, foamed gaskets are formed by on-line gasket system (OLGS), respectively.

In the past, urethane foams have been used as the afore-mentioned foamed gasket.

However, it is feared that the urethane foams are gelled in the mixing chamber since the pot life of the urethane foams is short at several seconds to 2 minutes, and thus, the mixing of the main agent and the curing agent becomes difficult in the on-line system, and moreover, it is difficult to keep the shapes unchanged between the starting time and the ending time of the coatings since the reaction thereof immediately starts after the coating, and furthermore, it is necessary to prepare spaces for curing since the curing time is long at 60 minutes to 24 hours, and accordingly, it can be said that it is difficult to mix them homogeneously and rapidly with a simple step, and thus, they become inferior in workability. Moreover, the rate of closed cells thereof is low at below 20 percent, and thus, the sealing level becomes inferior, and further, the heatproof temperature is low in the range from $-20°$ to $100°$ C., and thus, the availability thereof becomes limited.

Therefore, the afore-mentioned urethane foams can only be used limitedly with the parts in which the sealing grooves are large or the high gasket efficiency is not required.

SUMMARY OF THE INVENTION

It is an object of the present invention to provide a method of forming a foamed gasket wherein the disadvantages found in the prior are overcome.

It is another object of the present invention to provide such a method wherein expandable polysiloxanes of two-liquids type are used as a raw material, which are long in pot life at 30 seconds to 10 minutes, short in curing time at 3 to 30 minutes, and high in the rate of closed cells at above 50 percent.

It is furthermore another object of the present invention to provide such a method wherein there is no possibility of gelling or thickening in the mixing chamber because of the long pot life of the materials, and thus making it easy to mix a main agent and a curing agent in on-line systems.

It is moreover another object of the present invention to provide such a method wherein the materials may foam with enought leveling after the coating by a robot because of the long pot life thereof, and thus, becoming high in accuracy of the shape of the gasket and capable of stabilizing the quality thereof.

It is further another object of the present invention to provide such a method wherein final products are obtained within a short time because the curing time of the materials is short, and thus, becoming capable of eliminating the space for curing.

It is furthermore another object of the present invention to provide such a method wherein the compressive and restoring property of the gasket is high because the rate of closed cells is high, and thus, becoming excellent in sealability.

It is moreover another object of the present invention to provide such a method wherein the heatproof temperature of the gasket is wide in the range from $-40°$ to $200°$ C., and thus becoming excellent in availability.

According to the present invention, the above objects are accomplished by providing a method of forming a foamed gasket having organopolysiloxanes as main ingredients which comprise the steps of separately introducing a composition of expandable polysiloxanes which is composed of two liquids of a main agent and a curing agent into a mixing chamber, said mixing chamber having a rotor secured in the inside thereof and a nozzle formed on the bottom thereof, said rotor being cut on the surface thereof to form grooves, mixing both liquids in the mixing chamber by rotating the rotor, discharging the obtained mixture on the sealing part of an article to be coated through said nozzle, and foaming and curing it to form a foamed gasket.

DETAILED DESCRIPTION

Figure 1:
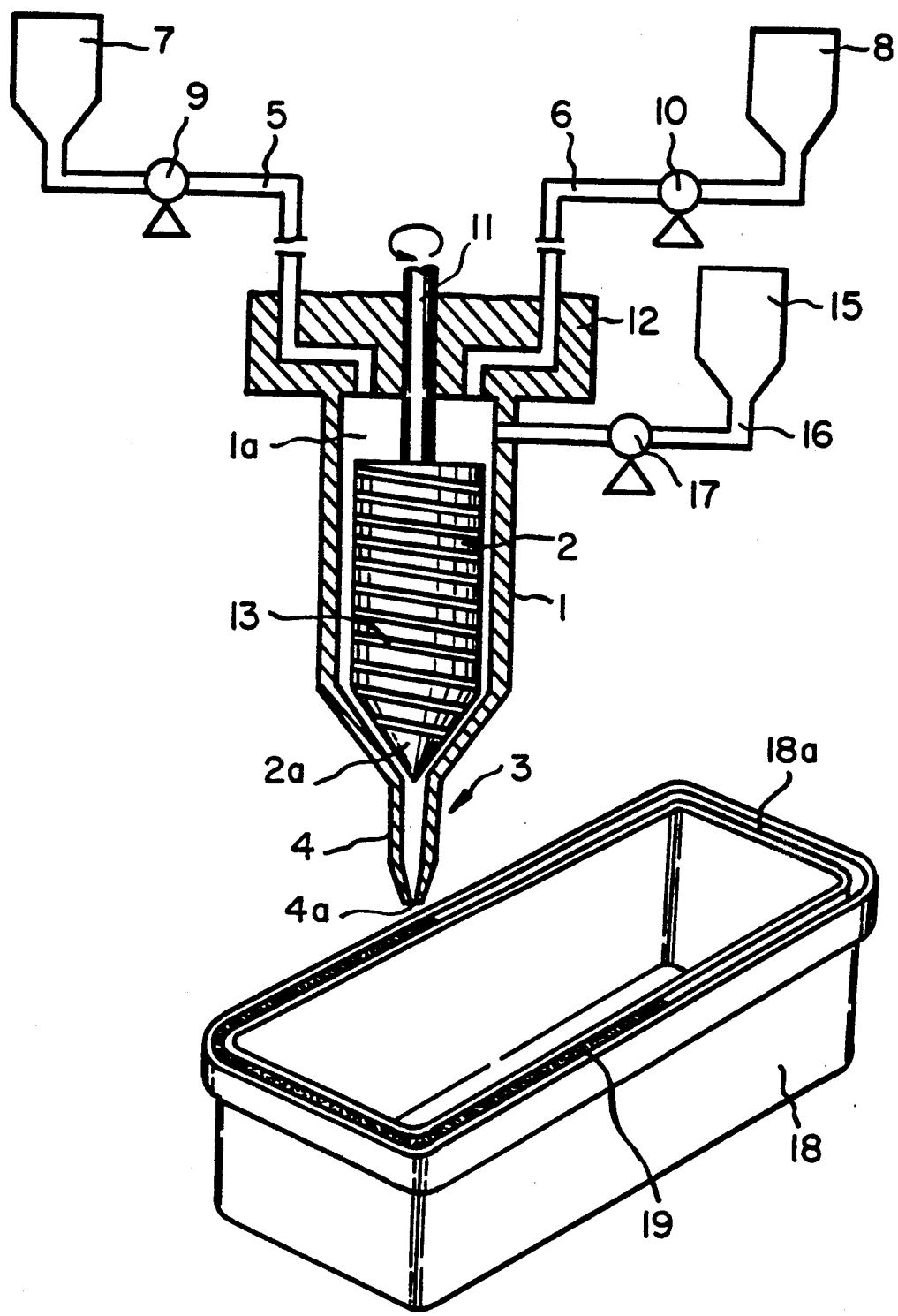
FIG. 1 shows a sectional view of one embodiment of the apparatus for practicing the method of the present invention.

The present invention is illustrated in detail by the attached drawings as follows:

FIG. 1 shows a sectional view of one embodiment of the apparatus for practicing the method of the present invention. The reference numeral 1 shows a mixing chamber. In the inside 1a thereof, a rotor 2 is secured, and on the bottom 3 thereof, a nozzle 4 is formed. Moreover, tanks 7 and 8 are installed to be connected to the inside 1a of the mixing chamber 1 through pipes 5 and 6, and also pumps 9 and 10 are installed on the desired positions of the pipes 5 and 6.

The rotor 2 is in a cylindrical shape tapered at the end 2a as indicated in FIG. 1, having a spindle 11 in a central axis, and is rotatably hung in the inside 1a of the mixing chamber 1 by piercing the top 12 of the mixing chamber 1 with an upper part of the spindle 11.

Figure 2:
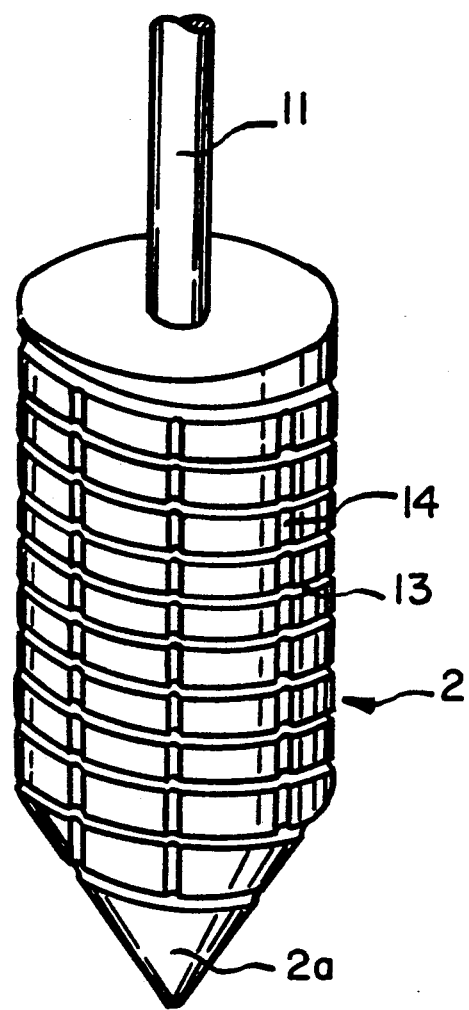
FIG. 2 shows another embodiment of the rotor in the apparatus of FIG. 1.

On the surface of the rotor 2, grooves 13 are cut. The grooves 13 may be in various shapes, such as spiral grooves 13 as mentioned in FIG. 1, or combined grooves of plural and longitudinal grooves 14 cut with a desired distance and spiral grooves 13 as indicated in FIG. 2.

Additionally, the reference numeral 15 is a tank in which washing solvents, such as toluene, trichlene, etc. are contained, and it is connected to the inside 1a of the mixing chamber 1 through pipe 16. On the pipe 16, pump 17 is installed.

Into said mixing chamber 1, a composition of expandable polysiloxanes composed of two liquids of a main agent and a curing agent is separately introduced, respectively, and mixed.

The composition of expandable polysiloxanes used in the present invention is indicated as the following [I] and [II].

[I] The composition composed of the following ingredients (a) to (d).
(a) Organopolysiloxanes having at least two or more alkenyl radicals in one molecule,
(b) Organopolysiloxanes having silanol radicals in the molecules,
(c) Curing catalysts,
(d) Organopolysiloxanes having hydroxysilyl radicals in the molecules.

In the afore-mentioned ingredients, ingredients (a), (b) and (c) are provided as a main agent and ingredient (d) is provided as a curing agent, and the main agent and curing agent are separately contained in the tanks 7 and 8, respectively.

The afore-mentioned ingredients (a) to (d) are exemplarily shown as follows.

The organopolysiloxanes used as ingredient (a) are explained as the compounds having alkenyl radicals bonded to at least two silicon atoms in one molecule, and are designated as the formulas of

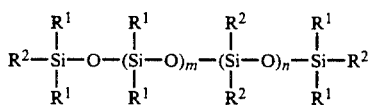

or

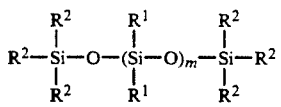

in which $R^1$ indicates alkyl radicals having 1 to 6 of carbons, such as methyl radical, ethyl radical, propyl radical, butyl radical etc., aryl radicals such as phenyl radical, tolyl radical etc., or the same or different kinds of non-substituted or substituted monohydrocarbon radicals except aliphatic unsaturated radicals, selected from chloromethyl radical, trifluoropropyl radical, cyanoethyl radical and the like, which are obtained by substituting a part or all of hydrogen atoms bonded to the carbon atoms of said radicals with halogen atoms, cyano radicals and the like, $R^2$ indicates alkenyl radicals, such as vinyl radical, allyl radical etc., m is 50 to 100000, and is shown as n/m=0 to 0.1, and moreover is such that it can contain at least two alkenyl radicals represented by $R^2$ in one molecule.

The organopolysiloxanes having silanol radicals bonded to at least one silicon atom in one molecule as ingredient (b) of the present invention act as a blowing agent in the composition by reacting with ingredient (d) to generate hydrogen gas, or act as a crosslinking agent together with the blowing agent in case of the organopolysiloxanes having silanol radicals bonded to more than three silicon atoms. They may preferably have molecular weights lower than ingredient (a) to be compatible with ingredient (a). They may be chain compounds, and are exemplarily shown as follows.

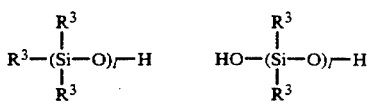

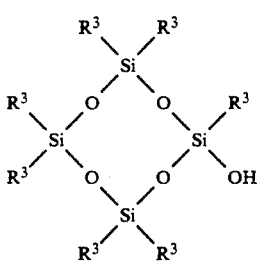

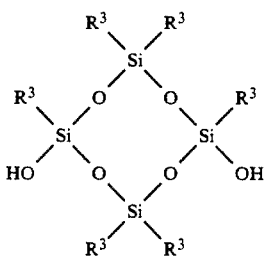

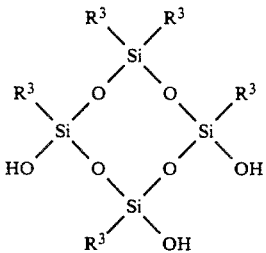

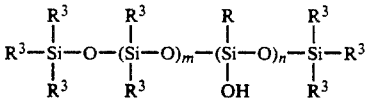

In the formulas, $R^1$ indicates alkyl radicals having 1 to 6 of carbons, such as methyl radical, ethyl radical, propyl radical, butyl radical etc., aryl radicals such as phenyl radical, tolyl radical etc., or same or different kinds of non-substituted or substituted monohydrocarbon radicals except aliphatic unsaturated radicals, selected from chloromethyl radical, trifluoropropyl radical, cyanoethyl radical and the like, which are obtained by substituting a part of all of hydrogen atoms bonded to the carbon atoms of said radicals with halogen atoms, cyano radicals and the like, l is 1 to 1000, m and n are 1 to 50, and is such that it can contain at least one hydroxyl radical in one molecule.

The curing catalysts as ingredient (c) of the present invention act as catalyzers for the addition reaction of ingredients (a) and (d) and the condensation reaction of ingredients (b) and (d), and they may be well known platinum or platinum compounds, and platinum complexes, and accordingly they are exemplarily indicated as catalyzers obtained by supporting platinum black or platinum to silica, carbon black etc., or platinum compounds, such as chloroplatinic acid, alchohol solution of chloroplatinic acid, complex of chloroplatinic acid and olefins or vinylsiloxanes and the like.

Moreover, organohydrogensiloxanes or organohydrogenpolysiloxanes used as ingredient (d) act as a blowing agent in the composition by reacting with ingredient (b) in condensation reaction to generate hydrogen gas, and at the same time, act as a crosslinking agent by reacting with ingredient (a) behaving in addition reaction. They may be mono, di, or tri-hydroxysilane, or chain or cyclohydrogenpolysiloxane, and may preferably have molecular weights lower than ingredient (a) to be compatible with the composition. The blending amounts of ingredient (d) are such that if the amounts of SiH combination therein are less than 1 mol to the total of the alkenyl radicals contained in ingredient (a) and the silanol radicals contained in ingredient (b), the addition reaction with ingredient (a) and the condensation reaction with ingredient (b) become inadequate, and thus, the expansion ratio becomes inadequate, and if the amounts of SiH combination therein are more than 50 mol, the product obtained by the reactions becomes brittle, or the excessive SiH combination remains in the composition, and the composition is varied as the the time proceeds, and thus the desired expandable composition can not be obtained, and thus the amounts of SiH combination therein are within the range of 1 to 50 times, preferably 3 to 10 times mols to the total of alkenyl radicals contained in ingredient (a) and silanol radicals contained in ingredient (b).

The composition of the present invention is obtained as a two-liquids type room temperature curing composition by homogeneously mixing desired amounts of ingredients (a), (b) and (c) to prepare a main agent, and by homogeneously mixing desired amounts of ingredient (a) and (d) to prepare a curing agent. The composition is subjected to an expanding reaction and a crosslinking reaction by mixing the main agent with the curing agent in a desired amount ratio to be cured as a foamed rubber elastomer.

Additionally, into the composition, the following additives may be added: fillers such as zinc oxide, magnesium oxide, calcium carbonate, etc., reinforcements such as aerosol silica, precipitated silica, titanium dioxide, aluminium oxide, powdered quartz, talc, bentonite and the like, fibrous fillers such as asbestos, glass fibers, organic fibers and the like, colorants such as pigments, dyestuffs, and the like, agents for improving heat resistance, such as red oxide, selemium oxide, etc., agents for improving low-temperature resistance, thixotropic agents such as polyethers, etc., rust inhibitors, agents for improving adhesion force, such as γ-acryloxypropyltrimethoxysilane etc., liquid reinforcements, such as network polysiloxanes consisting of triorganosiloxy units and SiO₂ units, and the like, thickeners (viscosity controlling agent) such as non-functional silicone oils and the like. These additives may be added in a desired amount when necessary.

[II] The composition composed of the following ingredients (A) to (E).

(A) α, ω-dihydroxyorganopolysiloxanes represented by a general formula of

HO—SiR¹R²O—$_L$H in which R¹ and R² are different or same kinds of substituted or non-substituted monohydrocarbon radicals except aliphatic unsuturated hydrocarbon radicals, L is an integer of 200 to 3000.

(B) organopolyhydroxypolysiloxanes represented by a general formula of

R³ SiO—SiR³R⁴O—$_M$—SiR⁵(OH)O—$_N$ SiR³ in which R³, R⁴ and R⁵ are same or different kinds of substituted non-substituted monohydrocarbon radicals except aliphatic unsuturated radicals, M is an integer of 2 to 20, N is integer of 3 to 20.

(C) Polyorganohydrogensiloxanes having at least two of the units represented by a general formula of $$R_a^6H_bSiO_{\frac{4-(a+b)}{2}}$$

in such amounts that SiH radicals are within the range from 0.5 to 30 mol to 1 mol of the total amounts of silanol radicals in the ingredients (A) and (B), in which R⁶ shows monohydrocarbon radicals except aliphatic unsuturated hydrocarbon radicals, a is a number selected from 0, 1, 2, b is a number selected from 1, 2, 3, a+b is a number of either 1, 2 or 3.

(D) Platinum or platinum compounds.

(E) Organic silicone compounds represented by a general formula of

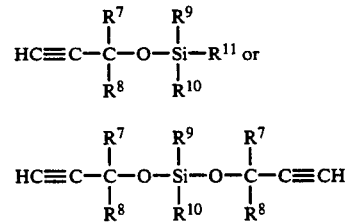

in which R⁷, R⁸, R⁹, R¹⁰ and R¹¹ are hydrogen atom or same or different kinds of non-substituted or substituted aliphatic monohydrocarbon radicals having 1 to 10 of carbon atoms.

This composition is a room-temperature curing expandable composition excellent in expansion ratio and foam stabilization. In the composition, the four ingredients (A), (B), (D) and (E) are provided as a main agent, and the two ingredients (A) and (C) are provided as a curing agent, and the main agent and curing agent are separately contained in tanks 7 and 8 of FIG. 1, respectively.

The α, ω-dihydroxyorganopolysiloxanes represented by a general formula of HO—SiR¹R²O—$_L$H used as said ingredient (A) necessarily have the degree of polymerization L ranging from 200 to 3000, preferably from 300 to 2000 for giving mechanical strength to the cured polysiloxane foams. When the value of said L is less than 200, the cured polysiloxane foams are inadequate in elongation, and when the value of said L is more than 3000, it is also not preferable since the handling becomes difficult.

In the general formula, R' and R' are same or different kinds of substituted or non-substituted monohydrocarbon radicals except aliphatic unsaturated hydrocarbon radicals, and these radicals are exemplarily designated as alkyl radicals such as methyl radical, ethyl radical, propyl radical, butyl radical, benzyl radical, hexyl radical, and the like, aryl radicals, such as phenyl radical, tolyl radical, naphthyl radical and the like, and substituted monohydrocarbon radicals, such as chloromethyl radical, 3, 3, 3 trifluoropropyl radical and the like, and said $R^1$ and $R^2$ may be same or different kinds. Especially, said both of $R^1$ and $R^2$ are preferably methyl radicals by reason of the ease to obtain and the viscosity of the composition.

Moreover, said ingredient (B) acts to increase the expansion ratio of the expandable polysiloxane composition by the hydroxyl radicals therein, and further, gives excellent foam stability to the composition by giving thixotropic property thereto, and is exemplarily shown as organopolyhydroxypolysiloxanes represented by a general formula of $$R^3SiO\text{—}SiR^3R^4O\text{—}_M\text{—}SiR^5(OH)O\text{—}_N SiR^3$$

in which $R^3$, $R^4$ and $R^5$ are different or same kinds of substituted or non-substituted monohydrocarbon radicals except aliphatic unsaturated hydrocarbon radicals, and preferably, $R^3$, $R^4$ and $R^5$ are all methyl radicals by the reason of the ease to obtain and the viscosity of the composition.

M is an integer of 2 to 20, N is an integer of 3 to 20, and especially, it is preferable that M and/or N are within the range from 10 to 20. When N is less than 3, the expansion ratio becomes low, and thus, the room-temperature curing expandable polysiloxanes composition excellent in expansion ratio can not be obtained.

Moreover, the ratio of M/N is preferably more than 1. When the ratio of M/N is less than 1, the silanol radicals in the part of $(SiR^5(OH)O\text{—}_N$ become comparatively unstable, and thus, it sometimes becomes difficult to obtain stable expansion ratio and foam stability.

The amounts of ingredient (B) to be added are 1 to 50 parts by weight to 100 parts by weight of ingredient (A), preferably 1 to 20 parts by weight. When the amounts of ingredient (B) to be added are less than 1 part by weight, the expansion ratio becomes low, and thus, the room-temperature curing polysiloxanes composition excellent in expansion ratio can not be obtained. Moreover, when the amounts are more than 50 parts by weight, the mechanical strength of the polysiloxane foams becomes inadequate.

The afore-mentioned ingredient (C) is a compound having hydrogen atoms directly bonded to silicone atoms, and generates hydrogen gas by the dehydrogenation reaction with organic silicone compounds having hydroxyl radicals directly bonded to silicon atoms in the ingredients (A) and (B) and, further, contributes to the crosslinking reaction. This ingredient (C) designates polyorganohydrogensiloxanes having at least two of the unit represented by a general formula of

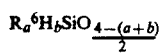

in which a is a number selected from 0, 1 or 2, b is a number selected from 1, 2 or 3, a+b is a number selected from 1, 2 or 3, $R^6$ shows monohydrocarbon radicals except aliphatic unsaturated hydrocarbon radicals, and is exemplarily shown as alkyl radicals having 1 to 6 of carbons, such as methyl radical, ethyl radical, propyl radical, benzyl radical, hexyl radical and the like. Especially, the $R^6$ is preferably methyl radical by the reason of the ease to obtain.

The hydrogen atoms directly bonded to silicon atoms may be in the terminals or side chains of the molecule, and moreover, the molecule may be in the shape of chain, ring or branch.

The amounts of ingredient (C) to be used are such that SiH radicals are within the range from 0.5 to 30 mol, preferably from 2 to 20 mol to 1 mol of the total amounts of silanol radicals in the ingredients (A) and (B). When the amounts are less than 0.5 mol, the room-temperature curing expandable polysiloxanes composition excellent in expansion ratio and foam stabilization can not be obtained. When the amounts are more than 30 mol, the mechanical strength of the polysiloxane foams are inadequate.

The ingredient (D) is platinum or platinum compound to accelerate the dehydrogenation reaction of ingredient (A) or (B) with ingredient (C), and is exemplified as platinum metal, chloroplatinic acid, complexes of platinum and olefin compounds, complexes of platinum and silanes containing vinyl radicals or siloxanes, phosphite complexes of platinum and the like. In these examples, chloroplatinic acid and complexes of platinum and olefin compounds are preferable because they give the stabilization to the composition prior to the curing, and moreover, give an adequate foaming speed. The amounts of said ingredient (D) to be used are in the range from 0.1 to 200 ppm, preferably from 1 to 50 ppm as platinum metal to the total weight of said ingredients (A), (B) and (C). When the amounts are less than 0.1 ppm, the dehydrogenation reaction becomes slow, and when the amounts are beyond 200 ppm, specially new effects do not be expected, and thus, they are economically disadvantageous.

The ingredient (E) is generally used as controlling agent for the addition type RTV, and designated by general formulas

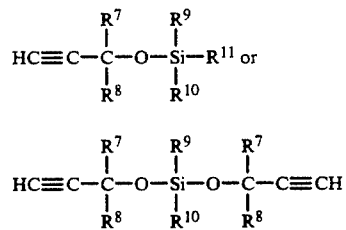

in which $R^7$, $R^8$, $R^9$, $R^{10}$ and $R^{11}$ are respectively hydrogen atoms or aliphatic monohydrocarbon radicals having 1 to 10 of carbons, for example, alkyl radicals, such as methyl radical, ethyl radical, propyl radical, butyl radical etc., aryl radicals, such as phenyl radical, tolyl radical etc., alkenyl radicals such as allyl radical etc., and the like. Said derivatives of acetylene alcohol contribute to the improvements of the reaction control of foams and the foam stability, based on SiH/SiOH dehydrogenation reaction of the present invention, and the most characteristic feature of said composition [II] resides in the combined use of said ingredient.

The examples of ingredient (B) are shown as follows.

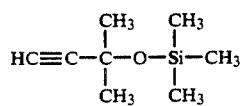

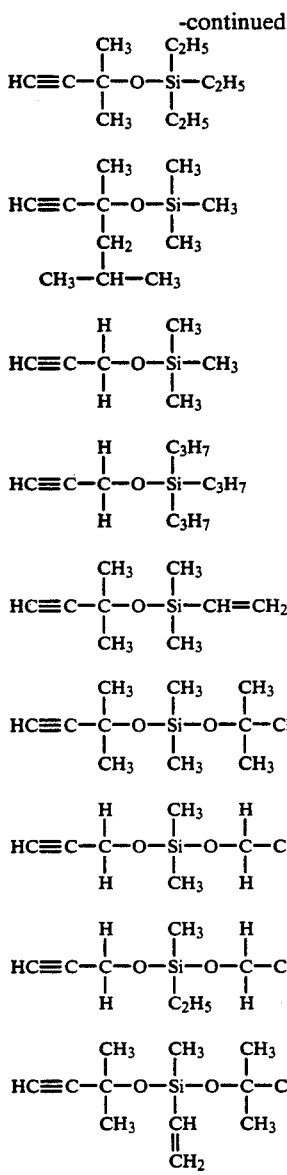

The amounts of said organic silicone compounds to be added are within the range from 0.001 to 10 parts by weight, preferably 0.001 to 1.0 part by weight to 100 parts by weight of the total amounts of said ingredients (A), (B), (C) and (D). When the amounts are less than 0.001 part by weight, the workability goes down since the viscosity of said composition greatly increases within a short time, and when the amounts are more than 10 parts by weight, the curability of the composition decreases extremely.

In said composition [II], low molecular siloxanes containing vinyl radical may be furthermore used as controlling agents, but these are slightly inferior to the derivatives of acetylene alcohol concerning the foam stability.

Moreover, in said expandable polysiloxanes composition, polyorganosilylsiloxanes closed at both terminals or one side terminal with triorganosilyl radicals, silanes containing vinyl radicals, siloxanes and the like may be added into either the main agent or the curing agent according to demand with the limitation that the effects are not damaged, and further, the additives, such as fillers, pigments, dyestuff, heat resistants, fire retardants and the like may be used at the same time.

And then, the main agent and the curing agent are respectively and separately introduced into the inside 1a of the mixing chamber 1 from the tanks 7 and 8 by the operations of the pumps 9 and 10 through the pipes 5 and 6.

At this time, the ratio of the main agent and the curing agent are predetermined to be reacted with equal amounts since it is easily handled to introduce the main agent and the curing agent in about equal amounts.

Moreover, spindle 11 is rotated at 50~1000 rpm, preferably 100~300 rpm to rotate rotor 2, and said both liquids are mixed in the mixing chamber 1. The obtained mixture descends along the spiral grooves 13, and is discharged to make a shape of a sealant on the sealing part 18a (sealing groove) of an article 18 to be coated (for example, a water proof case for containing electronic part etc., of a car shown in FIG. 1) from the tip 4a of a nozzle 4, and foamed and cured to form a foamed gasket 19.

Figure 3:
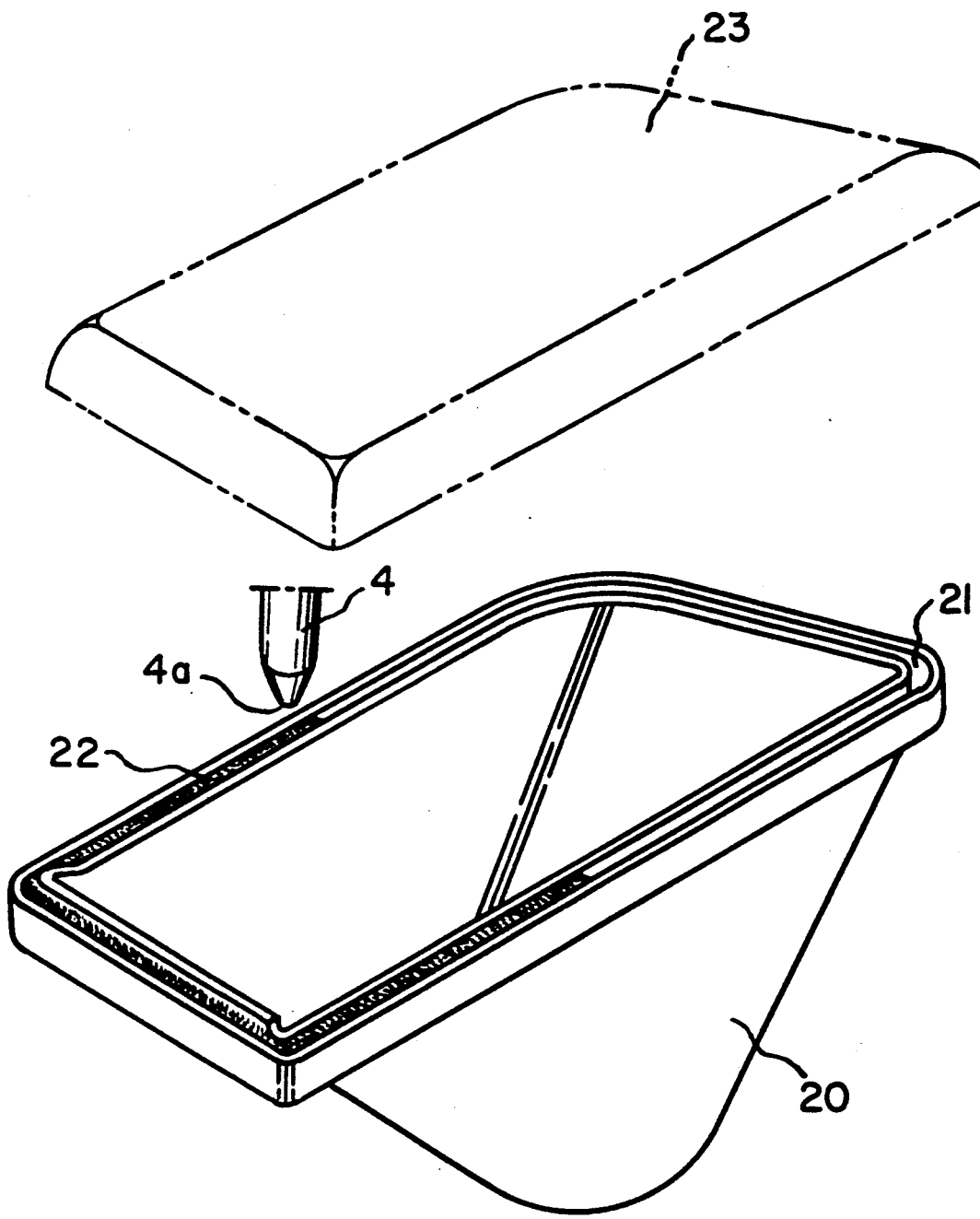
FIG. 3 shows a partially omitted view of a head-light of a car as an article to be coated.

The FIG. 3 shows a head light of a car as an article to be coated. In FIG. 3, the mixture of the present invention is discharged from the tip 4a of a nozzle 4 as same as FIG. 1 to fill a sealing groove 21 of the article to be coated 20 (a head light body) with the mixture, and to form a foamed gasket 22. The reference numeral 23 is a glass cap of the head light body 20.

The functions of the present invention are as follows.

In FIG. 1, the main agent and the curing agent respectively contained in tanks 7 and 8 are introduced into the mixing chamber 1 in about equal amounts through pipes 5 and 6 by the operation of pumps 9 and 10. In the inside 1a of the mixing chamber 1, the introduced two liquids are homogeneously and rapidly mixed by the spiral grooves 13 formed on the surface of the rotor 2 by a simple step that the rotor 2 is rotated. The obtained mixture descends along the spiral grooves 13, and is discharged from the tip 4a of the nozzle 4 on the sealing groove 18a of the article to be coated, foamed and cured to form a foamed gasket 19.

In the present invention, expandable polysiloxanes of two-liquids type are used as a raw material for forming said main agent and curing agent, which are long in pot life at 30 seconds to 10 minutes, short in curing time at 3 to 30 minutes, and high in the rate of closed cells at above 50 percent.

Thus, there is no possibility of gelling or thickening in the mixing chamber because of the long pot life of the material, and as a result, the mixing of the main agent and the curing agent is easily accomplished in the on-line system with a mixing chamber having a rotor secured in the inside thereof on the surface of said rotor, grooves being cut.

Moreover, the final products are obtained within a short time because the curing time of the materials are short, and as a result, becoming capable of eliminating the space for curing. Furthermore, the compressive and restoring property thereof is high because the rate of closed cells is high, and thus becoming excellent in sealbility. Accordingly, the present invention is excellent in workability and may be applied to the on-line system, and the obtained foamed gasket is excellent in sealability.

Moreover, in the present invention, the mixture is only present in the grooves of the rotor, and never stayed in the mixing chamber 1.

Furthermore, the composition of the present invention is long in pot life, and thus it may be foamed with enough leveling after coating by the robot, and as a result, the obtained foamed gasket is excellent in accuracy of the shape, stable in the quality, and capable of applying to various fields since the heatproof temperature thereof is wide in the range from $-40°$ to $200°$ C.

EXAMPLE

EXAMPLE 1

The following ingredients (A) to (E) were used.

Ingredient (A):

$\alpha,\omega$-dihydroxyorganopolysiloxane having a viscosity of 20,000cs at 25° C. represented by the average structural formula of HO Si $(CH_3)_2O)_{600}H$.

Ingredient (B):

Organopolyhydroxpolysiloxane having a viscosity of 150cs at 25° C. represented by the average structural formula of

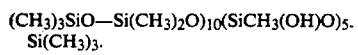
(CH$_3$)$_3$SiO—Si(CH$_3$)$_2$O)$_{10}$(SiCH$_3$(OH)O)$_5$.
Si(CH$_3$)$_3$.

Ingredient (C):

Polyorganohydrogensiloxane represented by the average structural formula of

(CH$_3$)$_3$SiO—SiCH$_3$(H)O)$_{38}$Si(CH$_3$)$_3$.

Ingredient (D):

Isopropyl alcohol solution containing 2% of chloroplatinic acid.

Ingredient (E):

Silicone compound having acetylenic unsaturated radicals represented by the structural formula of

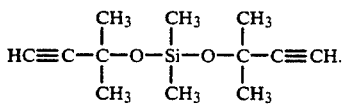

The afore-mentioned ingredients (A), (B), (D) and (E) amounting, respectively, to 90.0 parts by weight of the ingredient (A), 5.0 parts by weight of ingredient (B), 1.0 part by weight of the ingredient (D) and 0.05 part by weight of the ingredient (E), and moreover, 20 parts by weight of dimethylpolysiloxane oil and 10 parts by weight of aerosol silica were blended to prepare a main agent, and the afore-mentioned ingredients (A) and (C) amounting, respectively, 90 parts by weight of the ingredient (A) and 20.0 parts by weight of ingredient (C), and moreover, 20 parts by weight of dimethylpolysiloxane oil and 10 parts by weight of aerosol silica were blended to prepare a curing agent, and these two liquids of the main agent and the curing agent were respectively placed into tanks 7 and 8 in FIG. 1. Then, these main agent and curing agent were respectively and separately introduced into the inside 1a of the mixing chamber 1 with equal amounts through the pipes 5 and 6 by the operations of pumps 9 and 10, and at the same time, the spindle 11 of the rotor 2 was rotated with the speed of about 200 rpm to mix both liquids. The obtained mixture was cause to descend through the spiral grooves 13, discharged on the sealing groove 18a of the waterproof case 18 for cars through the tip 4a of the nozzle 4, foamed and cured after 3 minutes to form the foamed gasket 19.

The pot life of the mixture was 3 minutes and the curing time thereof was ten minutes.

After the finish, the washing liquid (such as toluene, trichlene and the like) was introduced into the mixing chamber 1 by the operation of a pump 17 through a pipe 16 from a tank 15 to wash the inside of the mixing chamber 1, the rotor, grooves 13 and the like.

The mixture was not gelled in the mixing chamber since the pot life of the mixture was 3 minutes, and the final product was quickly obtained since the curing time thereof was ten minutes. Moreover, the obtained foamed gasket had more than 90 percent rate of closed cells, and thus, it was excellent in sealability and complete in waterproof effect.

EXAMPLE 2

The following ingredients (a) to (e) were used.

Ingredient (a):

$\alpha,\omega$-divinylpolysiloxane having a viscosity of 10,000 cs at 25° C. represented by the average structural formula of

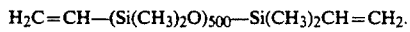
H$_2$C=CH—(Si(CH$_3$)$_2$O)$_{500}$—Si(CH$_3$)$_2$CH=CH$_2$.

Ingredient (b):

Organopolyhydroxypolysiloxane having a viscosity of 150 cs at 25° C. represented by the formula of

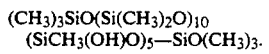
(CH$_3$)$_3$SiO(Si(CH$_3$)$_2$O)$_{10}$
(SiCH$_3$(OH)O)$_5$—SiO(CH$_3$)$_3$.

Ingredient (c):

Isopropyl alcohol solution containing 2% of chloroplatinic acid.

Ingredient (d):

Polyorganohydrogensiloxane represented by the average formula of

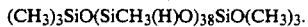
(CH$_3$)$_3$SiO(SiCH$_3$(H)O)$_{38}$SiO(CH$_3$)$_3$.

Ingredient (e):

Tetramethyltetravinylcyclotetrasiloxane represented by the structural formula of

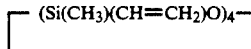

In the afore-mentioned ingredients, 100 parts by weight of the ingredient (a), 10 parts by weight of the ingredient (b), 0.8 part by weight of the ingredient (c) and 2 parts by weight of the ingredient (e), and moreover, 10 parts by weight of dimethylpolysiloxane oil and 10 parts by weight of aerosol silica were blended to prepare a main agent, and moreover, 100 parts by weight of the ingredient (a), 18 parts by weight of the ingredient (d), 10 parts by weight of dimethylpolysiloxane oil and 10 parts by weight of aerosol silica were blended to perpare a curing agent, and these two liquids of the main agent and the curing agent were respectively placed into tanks 7 and 8 in FIG. 1. Then, the main agent and curing agent were respectively and separately introduced into the inside 1a of the mixing chamber 1 with equal amounts through the pipes 5 and 6 by the operations of pumps 9 and 10, and at the same time, the spindle 11 of the rotor 2 was rotated with the speed of about 200 rpm to mix the two liquids. The obtained mixture was caused to descend through the spiral grooves 13, discharged on the sealing groove 18a of the waterproof case 18 for cars through the tip 4a of the nozzle 4, foamed and cured after 3 minutes to form the foamed gasket 19.

The pot life of the mixture was 3 minutes and the curing time thereof was ten minutes.

After the finish, the cleaning liquid (such as toluene, trichlene and the like) was introduced into the mixing chamber 1 by the operation of a pump 17 through a pipe 16 from a tank 15 to wash the inside of the mixing chamber 1, the rotor, grooves 13 and the like.

The mixture was not gelled in the mixing chamber since the pot life of the mixture was 3 minutes, and the final product was quickly obtained since the curing time thereof was ten minutes. Moreover, the obtained foamed gasket had more than 90 percent of the rate of closed cells, and thus, it was excellent in sealability and complete in waterproof effect.

The effects of the present invention are as follows.

According to the afore-mentioned present invention, the expandable polysiloxanes of two- liquids type are used as a raw material for forming said main agent and curing agent, which are long in pot life at 30 seconds to 10 minutes, short in curing time at 3 to 30 minutes, and high in the rate of closed cells at above 50 percent, and thus, there is no possibility of gelling or thickening in the mixing chamber because of the long pot life of the material, and as a result, the mixing of the main agent and the curing agent is easily accomplished in the on-line system, and the final products are obtained within a short time because the curing time of the materials are short, and as a result, becoming capable of eliminating the space for curing, and furthermore, the compressive and restoring property thereof is high because the rate of closed cells is high, and as a result, becoming excellent in sealability, and accordingly, the present invention is excellent in workability and may be applied to the on-line system, and the obtained foamed gasket is excellent in sealability.

Moreover, according to the present invention, the mixture only resides in the grooves of the rotor, and never stays in the mixing chamber 1.

Furthermore, the composition of the present invention is long in pot life, and thus it may be foamed with enough leveling after coating by the robot, and as a result, the obtained foamed gasket is excellent in accuracy of the shape, stable in the quality, and capable of applying to various fields since the heatproof temperature thereof is wide in the range from $-40°$ to $200°$ C.

What is claimed is:

1. A method of forming a foamed gasket having polysiloxanes as a main ingredient which comprises the steps of:

separately introducing a liquid main agent and a liquid curing agent into a mixing chamber to form a composition of expandable polysiloxanes, the mixing chamber having a rotor secured in the inside thereof and a nozzle formed on the bottom thereof, said rotor having longitudinal and spiral grooves on its surface, wherein said composition of expandable polysiloxanes is composed of the ingredients, (A) α, ω-dihydroxyorganopolysiloxanes represented by a general formula of

in which $R^1$ and $R^2$ are the same or different substituted or non-substituted monohydrocarbon radicals except aliphatic unsaturated hydrocarbon radicals, L is an integer of 200 to 3000, (B) organopolyhydroxypolysiloxanes represented by a general formula of

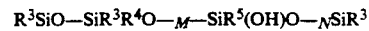

in which $R^3$, $R^4$ and $R^5$ are the same or different substituted or non-substituted monohydrocarbon radicals except aliphatic unsaturated hydrocarbon radicals, M is an integer of 2 to 20, N is an integer of 3 to 20, (C) polyorganohydrogensiloxanes having at least two of the units represented by a general formula of

in such amounts that SiH radicals are within the range from 0.5 to 30 mol to 1 mol of the total amounts of silanol radicals in the ingredients (A) and (B), in which $R^6$ represents monohydrocarbon radicals except aliphatic unsaturated hydrocarbon radicals, a is a number selected from 0, 1 and 2, b is a number selected from 1, 2 and 3, a+b is a number of either 1, 2 or 3, (D) platinum or platinum compounds, and (E) organic silicone compounds represented by a general formula of

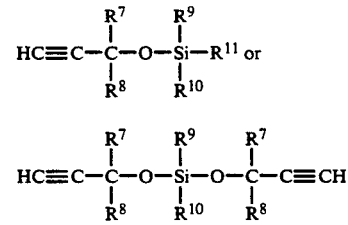

in which $R^7$, $R^8$, $R^9$, $R^{10}$ and $R^{11}$ are hydrogen atoms or the same or different non-substituted or substituted aliphatic monohydrocarbon radicals having 1 to 10 carbon atoms, said ingredients (A), (B), (D) and (E) are provided as said main agent, and said ingredients (A) and (C) are provided as said curing agent, and said two liquids of the main agent and the curing agent are separately introduced into the mixing chamber in about equal amounts, mixing both liquids in the mixing chamber by rotating the rotor, discharging the obtained mixture on the sealing part of an article to be coated through said nozzle, and foaming and curing the mixture to form a foamed gasket.

2. The method of forming a foamed gasket according to claim 1, wherein the amounts of ingredient (B) to be used are 1 to 50 parts by weight to 100 parts by weight of ingredient (A).

3. The method of forming a foamed gasket according to claim 1, wherein the amounts of ingredient (C) to be used are such that SiH radicals are within the range from 0.5 to 30 mol to 1 mol of the total amounts of silanol radicals in the ingredients (A) and (B).

4. The method of forming a foamed gasket according to claim 1, wherein the amounts of ingredient (D) to be used are in the range from 0.1 to 200 ppm as platinum metal to the total weight of said ingredients (A), (B) and (C).

5. The method of forming a foamed gasket according to claim 1, wherein the amounts of ingredient (E) to be used are in the range from 0.001 to 10 parts by weight to 100 parts by weight of the total amounts of said ingredients (A), (B), (C) and (D).

* * * * *